Patented Aug. 8, 1939

2,169,196

UNITED STATES PATENT OFFICE 2,169,196

PROCESS FOR THE PREPARATION OF DIBROMOAMINOANTHRAQUINONE COMPOUNDS AND PRODUCTS OBTAINABLE THEREBY

Henry R. Lee, South Milwaukee, and David X. Klein, Milwaukee, Wis., assignors to E. I. du Pont de Nemours & Company, Wilmington, Del., a corporation of Delaware No Drawing. Application October 21, 1937, Serial No. 170,190

5 Claims. (Cl. 260—379)

This invention relates to a new and improved process for preparing 1-amino-2,4-dibromoanthraquinones and to new compounds obtainable by such process.

In copending application Ser. No. 127,566, we have described a new and improved process for preparing 1-amino-2-anthraquinonesulfonic acid and its substitution derivatives in relatively pure form and high yield by a more simple and economical process than heretofore employed. This invention is directed to the conversion of 1-amino-2-anthraquinonesulfonic acids to the 1-amino-2,4-dibromo derivatives. We have now found that on subjecting 1-amino-2-anthraquinonesulfonic acid or its derivatives, such as the 5-, 6-, 7- or 8-chloro, 5- or 8-nitro, 5- or 6-alkoxy compounds, etc., to bromination at relatively low temperatures the bromine is first introduced in the 4 position. On further bromination the sulfonic acid group in the 2 position is readily replaced by bromine, and the resulting dibromo compounds of high purity are obtained in high yields. These dibromo compounds are valuable as dyestuff intermediates.

According to the prior art, 1-amino-2,4-dibromoanthraquinone and certain of its derivatives have been prepared by direct bromination of the alpha-aminoanthraquinone. This procedure, however, gives a very impure product due apparently to the formation of isomers, and due to other side reactions, and the 1-amino-2,4-dibromoanthraquinone can be obtained from the impure mass in yields of only approximately 80% of theory, based on the original alpha-amine employed.

It is therefore an object of this invention to provide an improved process for preparing 1-amino-2,4-dibromoanthraquinones of high purity and in high yields. It is a further object of the invention to prepare new 5- and 6-alkoxy derivatives of 1-amino-2,4-dibromoanthraquinones.

According to our invention 1-amino-2-anthraquinonesulfonic acid or its simple monovalent substitution derivatives, such as 5-, 6-, 7- or 8-chloro, 5- or 8-nitro, and 5- or 6-alkoxy compounds, etc., including the substituted alkoxy derivatives such as the 5-beta-hydroxy-ethoxy-1-amino-2-anthraquinonesulfonic acids, are subjected to bromination in an aqueous solution with bromine or in slightly acid solutions with a bromine liberating agent. Bromination is continued until two atoms of bromine have been introduced, the second atom replacing the sulfonic acid radical.

The following examples are given to illustrate the invention more fully.

Example 1

4060 parts by volume of an aqueous solution containing 303 parts of 1-aminoanthraquinone-2-sulfonic acid and 114 parts of sulfuric acid (100%) are brominated by adding 250 parts of "mining salt" (a technical mixture of 2 mols of sodium bromide with 1 mol of sodium bromate) as a 20% aqueous solution. The mining salt is added over a period of 10 hours at room temperature. The solution is stirred for a short period and then heated to 70–80° C., stirred for 1 hour and filtered. A quantitative yield of substantially pure 1-amino-2,4-dibromoanthraquinone is obtained.

Example 2

Starting with a compound containing bromine in the 4 position, such as 1-amino-4-bromo-2-anthraquinonesulfonic acid, the second bromine atom may be introduced by using substantially half the amount of bromine required in the preceding example. This reaction may be carried out as follows:

4060 parts by volume of an aqueous solution containing 382 parts of 1-amino-4-bromoanthraquinone-2-sulfonic acid and 57 parts of sulfuric acid (100%) are brominated by adding 125 parts of mining salt as a 20% aqueous solution. The mining salt is added over a period of 10 hours at room temperature. The solution is stirred for a short period and then heated to 70–80° C., stirred for 1 hour and filtered. A quantitative yield of substantially pure 1-amino-2,4-dibromoanthraquinone is obtained.

Example 3

90.75 parts of 1-amino-5-beta-hydroxy-ethoxy-2-anthraquinonesulfonic acid (obtained by reacting 1-amino-5-chloro-2-anthraquinonesulfonic acid with ethylene glycol in the presence of alkali) are dissolved in 1500 parts of water. 35 parts of 78% sulfuric acid are added and 62.5 parts of mining salt, as a 20% solution, are run into the above solution at 20–25° C. After the bromination is completed the suspension is heated to the boil, filtered, washed acid free and dried. A high yield of 1-amino-2,4-dibromo-5-glycoxy-anthraquinone is thus obtained in very pure form.

In the above examples, bromination of the starting material takes place at relatively low temperatures. After bromination is completed, however, the reaction mass is heated to from 70° C. to the boiling point of the solution to coagulate the insoluble product, thereby facilitating its filtration.

Because the bromination of the 1-amino-2-sulfonic acid anthraquinones of this type may be carried out at relatively low temperatures, the process is particularly suitable for the preparation of alkyl ether substitution products of 1-amino-2,4-dibromoanthraquinone, such as illustrated in Example 3. Other substituted alkyl ethers containing hydroxyl groups which may be further substituted in the side chain hydroxy radical, such as 1-amino-5- or 6-diethyleneglycoxy-2-anthraquinonesulfonic acid, may also be prepared by this process.

Bromination proceeds at normal room temperatures; although higher temperatures may be employed if desired, they are not necessary to complete the bromination reaction. The process is suitable for the preparation of many simple substitution derivatives of 1-amino-2,4-dibromoanthraquinone, such as 1-amino-2,4-dibromo-5- or 8-nitroanthraquinone, 1-amino-2,4-dibromo-5-, 6-, 7- or 8-chloroanthraquinone, 1-amino-2,4-dibromo-5- or 8-anthraquinonesulfonic acid, 1-amino-2,4-dibromo-6-anthraquinonecarboxylic acid, and aliphatic ethers of the class illustrated above. It will of course be understood that the process is applicable to the preparation of other 1-amino-2,4-dibromoanthraquinone substitution products so long as the additional substituent is not an amino or other radical that has a directive influence on the bromination, equal to that of the amino group in the 1 position.

We claim:
1. The process for preparing 1-amino-2,4-dibromoanthraquinone compounds which comprises reacting upon a 1-amino-2-anthraquinonesulfonic acid with bromine in an aqueous solution, sufficient bromine being introduced to completely replace the sulfonic acid radical which is present in the 2 position.

2. The process for preparing 1-amino-2,4-dibromoanthraquinone which comprises reacting 1-amino-2-anthraquinonesulfonic acid with bromine in an aqueous solution until two atoms of bromine have been introduced into the molecule.

3. The process for preparing 1-amino-2,4-dibromoanthraquinone which comprises reacting 1-amino-2-anthraquinonesulfonic acid with bromine in an aqueous solution until two atoms of bromine have been introduced into the molecule, and heating the mass after bromination has been completed until the product is in a readily filterable form.

4. 1-amino-2,4-dibromoanthraquinone carrying in one of the positions 5 and 6 a radical of the class consisting of —OR, —OR'OH and

OR'OR'OH, wherein R stands for an alkyl radical containing not more than 2 carbon atoms and wherein R' in each case stands for an alkylene radical containing not more than 2 carbon atoms.

5. 1-amino-2,4-dibromo-5-beta-hydroxy-ethoxyanthraquinone.

HENRY R. LEE.
DAVID X. KLEIN.